(12) United States Patent
Bhushan

(10) Patent No.: US 6,404,207 B1
(45) Date of Patent: Jun. 11, 2002

(54) SCANNING CAPACITANCE DEVICE FOR FILM THICKNESS MAPPING FEATURING ENHANCED LATERAL RESOLUTION, MEASUREMENT METHODS USING SAME

(75) Inventor: Bharat Bhushan, Powell, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 09/629,240

(22) Filed: Jul. 31, 2000

Related U.S. Application Data

(63) Continuation-in-part of application No. 09/422,376, filed on Oct. 21, 1999.
(60) Provisional application No. 60/156,409, filed on Sep. 28, 1999.

(51) Int. Cl.[7] ............................ G01R 27/26; B32B 3/02; G11B 20/00
(52) U.S. Cl. .................. 324/671; 324/658; 324/662; 324/668; 428/65.4; 369/53.1
(58) Field of Search ................. 324/671, 662, 324/663, 658, 686, 762, 761, 765, 457, 675, 667, 668; 428/65.4, 65.8; 369/53.1

(56) References Cited

U.S. PATENT DOCUMENTS

| | | | |
|---|---|---|---|
| 4,481,616 A | * 11/1984 | Matey | 369/58 |
| 5,065,103 A | * 11/1991 | Slinkman et al. | 324/458 |
| 5,523,700 A | * 6/1996 | Williams et al. | 324/765 |
| 5,985,404 A | * 11/1999 | Yano et al. | 428/65.3 |
| 6,198,300 B1 | * 3/2001 | Doezema et al. | 324/762 |

OTHER PUBLICATIONS

Novotny et al., Lubricant dynamics in sliding and fling, J. Appl. Phys. 70, 1991, 5647.

Leung et al., An Optical Method Using a Laser and an Integrating Sphere Combination for Characterizing the Thickness Profile of Magnetic Medica, IEEE Trans. Magn. 25, 1989, 3659.

Meeks et al., Optical Surface Analysis of the Head–Disk–Interface of Thin Film Disks, Trans. ASME 117, 1995, 112.

Jonsson et al., Measurement of rheological properties of ultrathin lubricant films at very high shear rates and near–ambient pressure, J. Appl. Phys. 78, 1995, 3107.

Hahm, et al., High Shear rate viscosity measurements of perfluropolyether lubricants for magnetic thin–film rigid disks, J. Appl. Phys. 81, 1997, 5384.

Novotny et al., Lubricant Removal, Degradation, and Recovery on Particulate Magnetic Recording Media, J. Tribology 114, 1992, 61.

Bhushan, Tribology and Mechanics of Magnetic Storage Devices, $2_{nd}$ Ed., Springer–Verlag, New York (entire book).

White, Viscous Fluid Flow, $2_{nd}$ Ed., McGraw–Hill, New York.

* cited by examiner

Primary Examiner—N. Le
Assistant Examiner—Anjan K. Deb
(74) Attorney, Agent, or Firm—Standley & Gilcrest LLP

(57) ABSTRACT

The present invention includes capacitive film thickness measurement devices and measurement systems. The invention also includes machines or instruments using those aspects of the invention. The present invention additionally includes methods and procedures using those devices of the present invention. The present invention discloses a capacitance measurement device and technique useful in determining lubricant film thickness on substrates such as magnetic thin-film rigid disks. Using the present invention, variations in lubricant thickness on the Angstrom scale or less may be measured quickly and nondestructively.

13 Claims, 4 Drawing Sheets

SCANNING CAPACITANCE DEVICE FOR FILM THICKNESS MAPPING FEATURING ENHANCED LATERAL RESOLUTION, MEASUREMENT METHODS USING SAME

This application is a continuation-in-part application of application Ser. No. 09/422,376 filed Oct. 21, 1999 claiming the benefit of Provisional Application Ser. No. 60/156,409 filed Sep. 28, 1999.

TECHNICAL FIELD OF THE INVENTION

The present invention is in the field of film thickness measurement methods and film thickness measurement devices.

BACKGROUND OF THE INVENTION

This invention relates to methods of measuring film thickness. More specifically, this invention relates to a capacitive measurement method useful in determining lubricant film thickness on substrates such as magnetic disks.

Monomolecularly-thick perfluoropolyether lubricants are used for lubrication of magnetic thin-film rigid disks and metal-evaporated magnetic tapes which are crucial to the durability of the head and medium surfaces. Monomolecularly-thick lubricant films are also being developed for lubrication of microdevices, commonly referred to as microelectromechanical systems (MEMS). Uniformity of these monolayer films in the lateral dimension on the order of a few nm is critical for producing surfaces with consistent tribological performance. Present techniques to measure the thickness of such films include X-ray photoelectron spectroscopy, Fourier transform infrared spectrometry, ellipsometry, and optical surface analysis. The first three of these methods produce point measurements and require a substantial amount of time to map a surface. Optical surface analysis is best suited to obtain lubricant film thickness maps, but is limited in vertical resolution of the lubricant film thickness in comparison to the other methods. Lateral resolution of the optical analysis method also ranges from about 10 to 200 $\mu$m.

It is thus an object of the present invention to develop a measurement method which can quickly, nondestructively and accurately map lubricant film thickness and characterize lubricant depletion with a lateral resolution on the nanometer scale.

Although described with respect to the field of lubricant film thickness measurements, it will be appreciated that similar advantages of quick, non-destructive capacitive measurements, as well as other advantages, may obtain in other applications of the present invention. Such advantages may become apparent to one of ordinary skill in the art in light of the present disclosure or through practice of the invention.

SUMMARY OF THE INVENTION

The present invention includes capacitive film thickness measurement devices and measurement systems. The invention also includes machines or instruments using those aspects of the invention. The present invention may be used to upgrade, repair, or retrofit existing machines or instruments of these types, using methods and components known in the art. The present invention also includes methods and procedures using these devices. The methods and procedures of the present invention may be applied using procedures and protocols known and used in the arts to which they pertain.

Included in the present invention is a film thickness measurement device utilizing an atomic force microscope (AFM). The AFM has a platform for supporting a film-coated conductive substrate. The AFM is configured to move a conductive probe along a path over the substrate. The conductive probe is adapted to oscillate during a first pass over a portion of the path so as to periodically contact the substrate. The AFM then lifts the probe a distance above the substrate and passes the probe for a second pass over that portion of the path.

During the second pass, the probe is at a sufficient distance from the surface of the substrate so as to not contact the film coating during the pass. A resonant capacitor sensor is also placed in connection with the conductive probe. A device is used to generate an electric field between the conductive probe and the film-coated conductive substrate. A capacitance-measuring device then measures the capacitance between the substrate and the probe while the probe is separated a distance from the substrate during a second pass over a portion of the substrate.

The AFM may also have a liquid-tight container adapted to maintain a liquid layer over the film-coated conductive substrate. The liquid layer should be of sufficient thickness to at least partially submerge the probe while the probe is separated from the film-coated substrate. It is preferred that the liquid be of a higher dielectric constant than the film.

Also included in the present invention is a method for measuring film thickness. In the method, a film-coated conductive substrate is placed upon a sample platform of an atomic force microscope (AFM). The AFM moves a conductive probe along a path over the substrate, the conductive probe adapted to oscillate during a first pass over a portion of the path so as to periodically contact the film-coated substrate. The probe is adapted to then pass along the path at a distance above the surface during a second pass over that portion, whereby the probe does not contact the surface. The conductive probe has a resonant capacitor sensor disposed thereon. An electric field is then generated between the conductive probe and the film-coated conductive substrate. The capacitance between the conductive probe and the film-coated conductive substrate is then measured over a second pass. The acquired measurements of capacitance are then used to calculate film thickness at each region of interest along the path.

DETAILED DESCRIPTION OF THE PREFERRED EMBODIMENT(S)

In accordance with the foregoing summary, the following presents a detailed description of the preferred embodiment of the invention that is currently considered to be the best mode.

Figure 1:
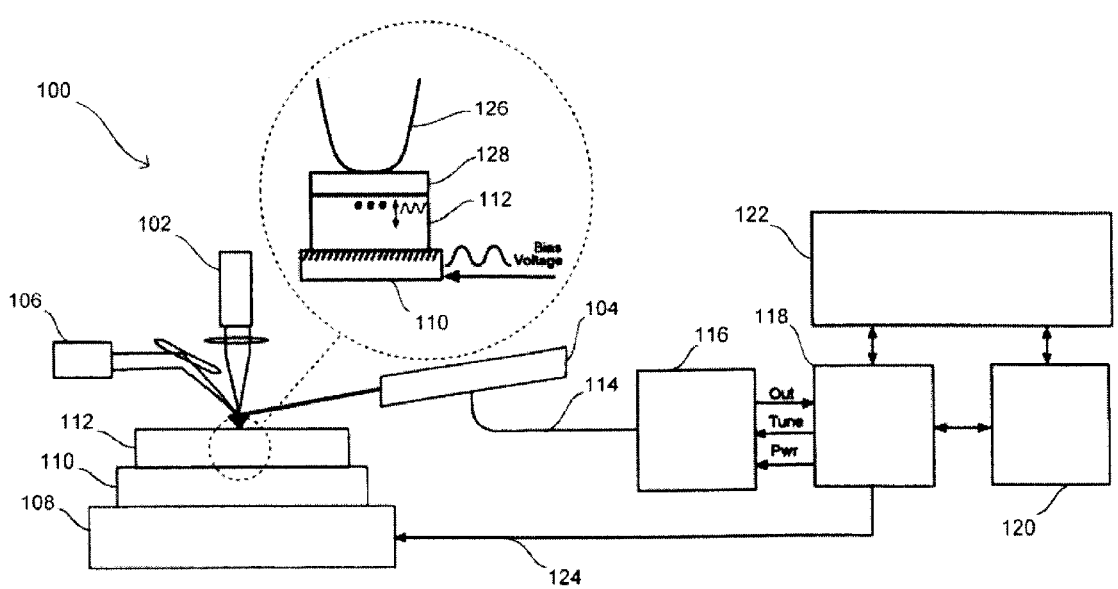
FIG. 1 is a diagram of a scanning microscope detection system of the prior art.

The scanning probe microscope, or atomic force microscope (AFM), is routinely used for imaging surface topography with atomic-scale resolution. Certain AFM models are also adapted to be used as a scanning capacitance microscope (SCM). These SCMs are used for imaging of semiconductor dopant sites. Such an SCM 100 is shown in FIG. 1. The SCM comprises, generally, a laser 102 that directs a beam toward an cantilever on a conductive AFM probe 104. The beam is reflected off the conductive (and reflective) probe 104 to a photodetector 106. The photodetector is usually a two- or four-part photodetector that is capable of determining the deflection of the cantiveler and torque on the cantilever by capturing the position of the reflected beam. A computer 122 connected to the system then calculates the topography of the surface as the tip 126 of the probe is scanned across the surface of the sample 112, or across an insulating layer 128 on the sample 112. The tip may be scanned across the sample in any appropriate pattern, such as a raster pattern, as directed by the SCM electronics 120. The tip may be in constant contact with the sample, but preferably oscillates near a resonant frequency and is separated from the sample such that the tip strikes the sample periodically along its path. The sample 112 is typically placed on an X-Y stage 108 and held in place by a vacuum chuck 110. The SCM contains capacitance measurement electronics 118 that capture capacitance readings from an UHF resonant capacitance sensor module 116.

An SCM 100 generates the necessary capacitance variations in the sample near the tip by applying an AC electric field between the AFM tip 126 and the sample 112. The SCM then measures the resulting change in capacitance. This is typically done by using a kHz AC bias voltage applied to the semiconductor 112. The free carriers in the semiconductor beneath the tip are alternately attracted and repulsed by the tip due to the alternating electric field, which is equivalent to a moving capacitor plate. Since the capacitance is inversely proportional to the distance between the plates, this movement varies the capacitive load on the resonant sensor system at the resonant frequency.

The UHF resonant capacitor sensor 116 is the basis of SCM detection. The resonator is connected to the cantilever/tip assembly (with a metal-coated tip) via a transmission line 114. When the resonating tip 126 is put in contact with a semiconductor 112, the sensor 116, transmission line 114, tip 126 and carriers in the sample near the tip all become part of the resonator. This means tip-sample capacitance and the associated variations will load the end of the transmission line and change the resonant frequency of the system. Small changes in the resonant frequency create enormous changes in resonance sensor output signal. Variations in capacitance as small as attofarads (aF=$10^{-18}$ F) may thus be measured.

A preferred embodiment of the present invention for lubricant film thickness mapping is a noncontact system. A scanning probe microscope, such as a Dimension 3000 AFM commercially available from Digital Instruments in Santa Barbara, Calif., may be modified to make the capacitance measurements. In a preferred AFM, a tip with an appropriate radius, preferably ranging from about 5 nm to 100 nm, is mounted on a flexible cantilever. It is preferred that the cantilever has a resonant frequency between 1 kHz and 200 kHz, although other frequencies may be appropriate for a given system or sample. The tip is used to scan the surface of interest with vertical and lateral resolutions on the nanoscale. For capacitance measurements, a conducting probe in conjunction with a capacitance sensor will be used. The conducting probe may contain any appropriate cantilever, such as a silicon cantilever having a conductive coating. Example coatings include nickel, cobalt, cobalt/chromium, or doped diamond.

Figure 2:
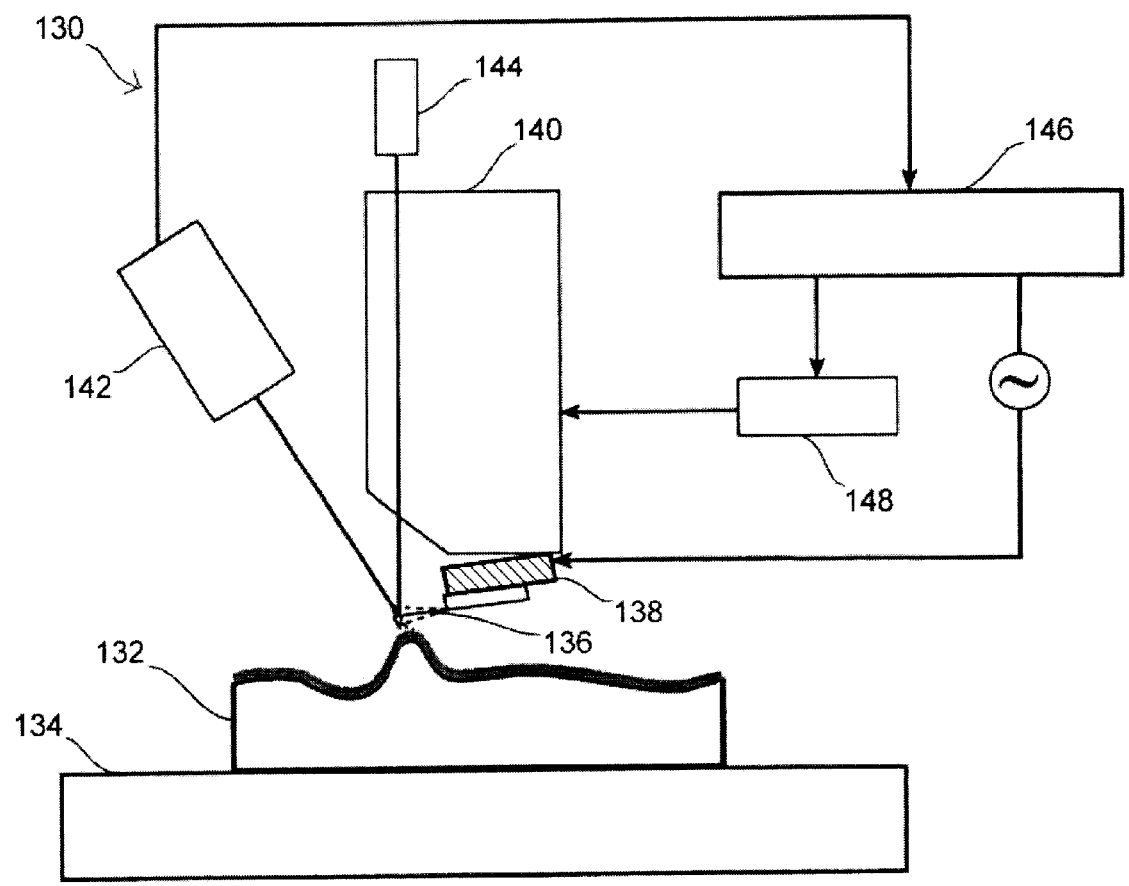
FIG. 2 is a diagram of a scanning apparatus of the present invention using intermittent probe contact to collect topographic information.
Figure 3:
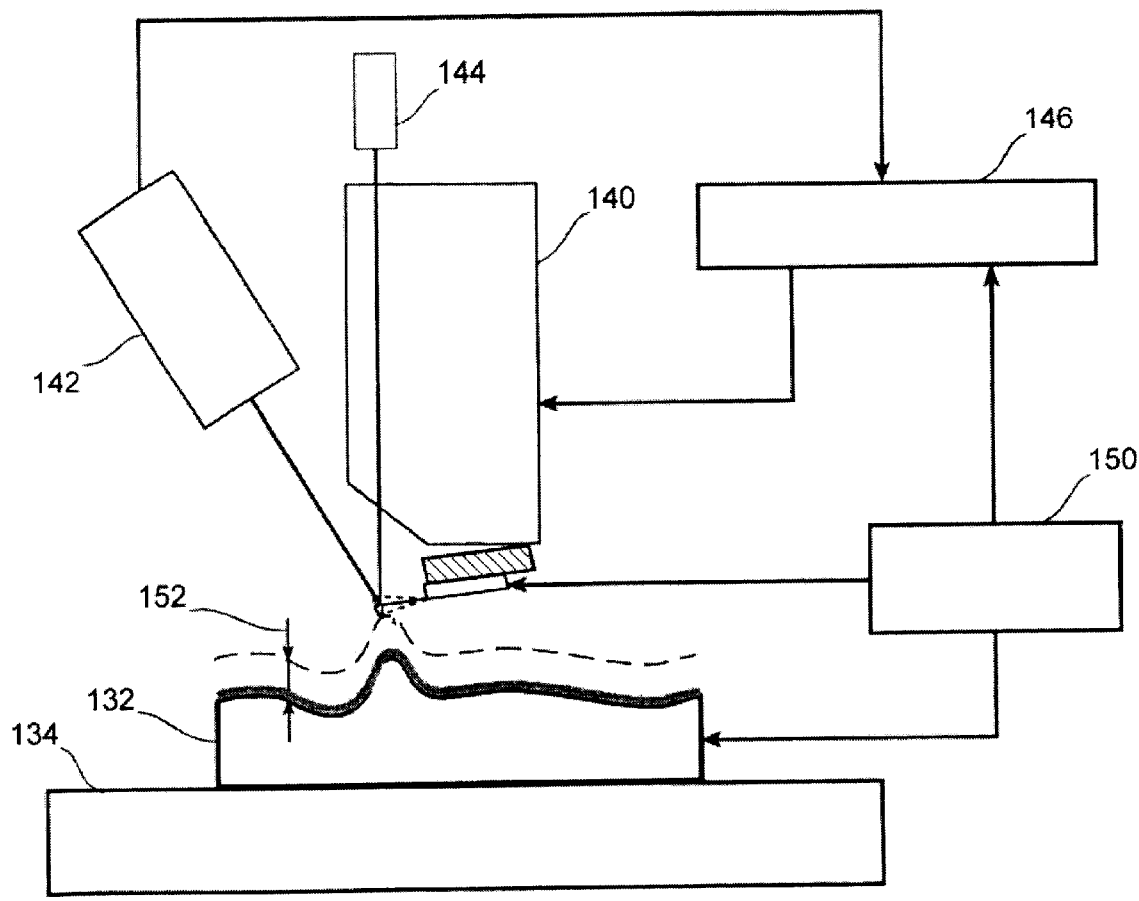
FIG. 3 is a diagram of a scanning apparatus of the present invention using a fixed separation mode to make capacitance measurements.

In a first preferred embodiment, measurements are preferably made in an interleave scan mode with resonant and lift modes. One example of a resonant mode is TappingMode™ commercially available from Digital Instruments. This system is shown in FIG. 2. The SCM 130 typically utilizes two piezoelectrics to drive the conductive probe 136, an X-Y-Z piezo 140 and a cantilever piezo 138. The probe 136 is positioned such that the beam from the laser 144 is focused on the photodetector 142. The sample 132, mounted on the X-Y stage 134, is preferably first profiled in a resonant mode. After each line of a topography scan is completed, the feedback loop controlling the vertical piezo is preferably turned off. The computer 140 takes the topographic information captured during the resonant scan mode and provides feedback 148 to the X-Y-Z piezo 140 such that the probe is properly lifted over the surface. The tip is then traced over the same topography at a constant distance 152, preferably about 100 nm, as shown in FIG. 3. During the "lifted" phase, the cantilever beam will be oscillated at natural frequency on the order of few kHz by applying an AC voltage at its natural frequency. A change of resonant frequency results because of changes in surface potential. The capacitance is then measured by a capacitance detection system 150 of the SCM. The potential change is a result of changes in the capacitance due to lubricant film thickness variation. This system provides a resolution in capacitance measurements on the order of 1 aF, resulting in vertical resolution of 0.1 nm or less. A sharp tip typically gives nanometer scale lateral resolution.

The measured capacitance is inversely related to the spacing, h, between the tip and the conducting substrate. For example, capacitance between a flat ended tip and a flat substrate separated by a spacing h may be given by:

$$\frac{1}{C} = \frac{\Delta V}{q} = \frac{h}{A\varepsilon_o \varepsilon_{substrate}} \quad (1)$$

where q is the charge on the tip, $\Delta V$ is the potential difference between the sample surface and the tip, A is the area of the tip and $\varepsilon_o$ and $\varepsilon_{substrate}$ are dielectric constants of the free space and substrate, respectively. The space includes the lubricant film and the air gap between the film and the tip. The total capacitance includes capacitance of the air and lubricant film:

$$\frac{1}{C} = \frac{1}{C_{air}} + \frac{1}{C_{lubricant}} \quad (2)$$

Figure 4:
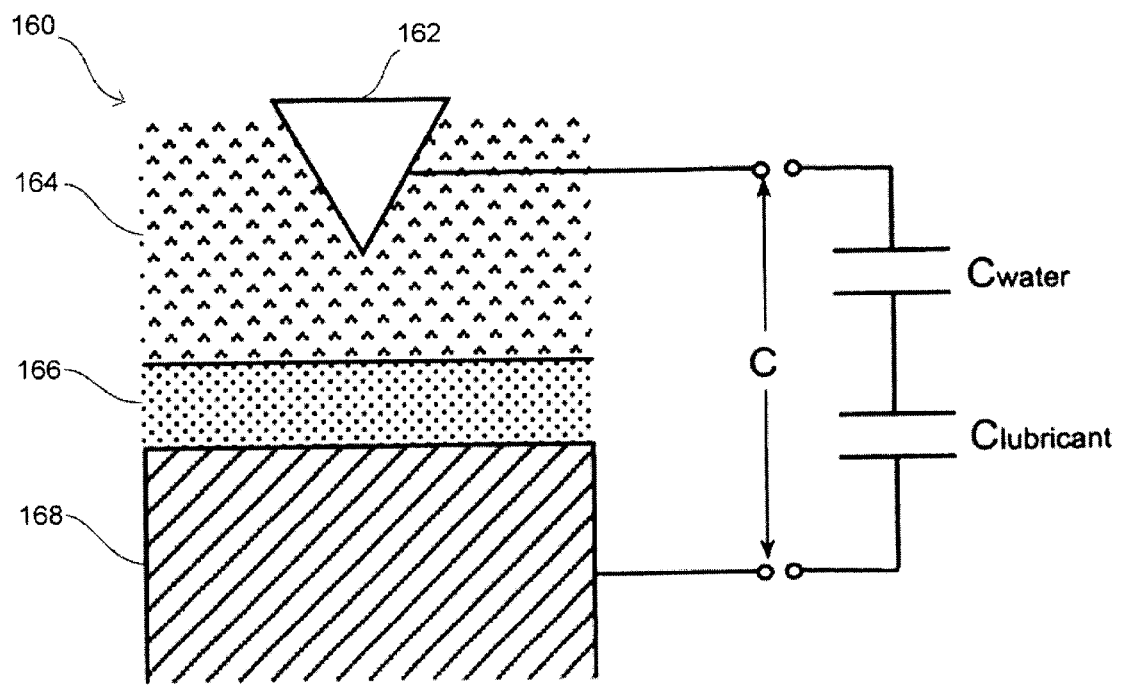
FIG. 4 is a diagram of a tip-sample interface in accordance with one embodiment of the present invention.

In the first preferred embodiment, minor variations in the air gap between the tip and the sample may result in errors in liquid film thickness measurements. In a second preferred embodiment, shown in FIG. 4, an AFM tip 162 of an SCM system 160 is scanned in a noncontact mode over a sample 168 having a film 166 on its surface. A layer of an appropriate liquid 164, such as water, is contained over the film 166. The thickness of the liquid layer 164 is preferably such that the tip 162 may be at least partially submerged in the liquid 164 while still being separated a distance from the surface of the film 166. The measured capacitance is then given by:

$$\frac{1}{C} = \frac{1}{C_{water}} + \frac{1}{C_{lubricant}} = \frac{1}{A\varepsilon_o}\left[\frac{h_{water}}{\varepsilon_{water}} + \frac{h_{lubricant}}{\varepsilon_{lubricant}}\right] \quad (3)$$

If $\varepsilon_{water}$ is sufficiently large as compared to $\varepsilon_{lubricant}$, the term due to the water will be small as compared to that of lubricant film, such that $$\frac{1}{C} \approx \frac{1}{A\varepsilon_o} \frac{h_{lubricant}}{\varepsilon_{lubricant}} \qquad (4)$$

Liquids such as water and ethylene glycol have high dielectric constants as compared to conventional liquid lubricants, so equation 4 holds for an interface interposed with liquid film of high dielectric constant. Data reduction techniques may also be used to obtain absolute values of film thickness.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

REFERENCES

1. Anonymous (1999), *Scanning Capacitance Microscopy*, Digital Instruments, Santa Barbara, Calif.
2. B. Bhushan (1996), *Tribology and Mechanics of Magnetic Storage Devices*, 2d edition, Springer, N.Y.
3. B. Bhushan (1999), *Handbook of Micro I Nanotribology*, $2^{nd}$ edition, CRC Press Boca Raton, Fla.
4. C. D. Hahm and B. Bhushan (1998), "Lubricant Film Thickness Mapping using a Capacitance Technique on Magnetic Thin Film Rigid Disks" Rev. Sci. Inst. 69, 3339–3349.
5. W. C. Leung, W. Crooks, H. Rosen, and T Strand (1989), IEEE Trans. Magn. 25, 3659.
6. S. W. Meeks, W. E. Weresin and H. J. Rosen (1995) ASME J Tribol. 117,112.
7. V. J. Novotny and M. A. B aldwinson (1991) J. Appl. Phys. 70, 5647.

The foregoing references are hereby incorporated herein by reference.

What is claimed is:

1. A film thickness measurement device comprising:
    a) an atomic force microscope comprising:
        (i) a platform for supporting a liquid film-coated conductive substrate, said liquid film-coated conductive substrate comprising a conductive substrate coated by a liquid film; and
        (ii) a conductive probe adapted to move along a path over said substrate, said conductive probe adapted to oscillate during a first pass over a portion of said path so as to periodically contact said conductive substrate and adapted to pass along said path at a distance above said conductive substrate during a second pass over said portion whereby the probe does not contact said conductive substrate, said conductive probe having a resonant capacitor sensor disposed thereon;
    b) a device adapted to generate an electric field between said probe and said conductive substrate; and
    c) a capacitance-measuring device adapted to measure capacitance between said conductive substrate and said conductive probe while said probe is separated a distance from said conductive substrate during a said second pass over said conductive substrate.

2. A film thickness measurement device according to claim 1 wherein said probe comprises at least one silicon cantilever having a conductive coating.

3. A film thickness measurement device according to claim 2 wherein said conductive coating is selected from the group consisting of nickel, cobalt, cobalt/chromium, and doped diamond coatings.

4. A film thickness measurement device comprising:
    a) an atomic force microscope comprising:
        (i) a platform for supporting a film-coated conductive substrate;
        (ii) a liquid-tight container adapted to maintain a liquid layer over said film-coated conductive substrate; and
        (iii) a conductive probe adapted to move along a path over said substrate, said conductive probe adapted to oscillate during a first pass over a portion of said path so as to periodically contact said substrate and adapted to pass along said path at a distance above said surface during a second pass over said portion whereby the probe does not contact said surface, said conductive probe having a resonant capacitor sensor disposed thereon, said conductive probe adapted to be at least partially submerged in said contained liquid;
    b) a device adapted to generate an electric field between said probe and said conductive substrate; and
    c) a capacitance-measuring device adapted to measure capacitance between said film-coated conductive substrate and said conductive probe while said probe is separated a distance from said substrate during a said second pass over said substrate.

5. A film thickness measurement device according to claim 4 wherein said probe comprises at least one silicon cantilever having a conductive coating.

6. A film thickness measurement device according to claim 4 wherein said conductive coating is selected from the group consisting of nickel, cobalt, cobalt/chromium, and doped diamond coatings.

7. A film thickness measurement device according to claim 4 wherein said liquid is selected from the group consisting of water and ethylene glycol.

8. A film thickness measurement device according to claim 4 wherein said liquid has a higher dielectric constant than said film.

9. A method for measuring film thickness, said method comprising the steps of:
    a) placing a film-coated conductive substrate upon a platform of an atomic force microscope, said atomic force microscope adapted to move a conductive probe along a path over said substrate, said conductive probe adapted to oscillate during a first pass over a portion of said path so as to periodically contact said substrate and adapted to pass along said path at a distance above said surface during a second pass over said portion whereby the probe does not contact said surface, said conductive probe having a resonant capacitor sensor disposed thereon;
    b) generating an electric field between said conductive probe and said film-coated conductive substrate;

c) measuring the capacitance between said conductive probe and said film-coated conductive substrate over a said second pass; and d) using the acquired measurements of said capacitance to calculate film thickness at each region of interest along said path.

10. A method for measuring film thickness according to claim 9 additionally comprising the step of averaging capacitance measurements.

11. A method for measuring film thickness according to claim 9 additionally comprising the step of normalizing capacitance measurements, whereby any effect of drift in capacitance is minimized.

12. A method for measuring film thickness according to claim 9 additionally comprising the step of taking an independent measurement of film thickness using an appropriate method whereby said capacitance measurements may be calibrated.

13. A method for measuring film thickness according to claim 9 additionally comprising the step of placing a liquid layer on said film-coated conductive substrate, said liquid layer of a thickness such that said probe is at least partially submerged when said probe is separated a distance from said substrate.

* * * * *